J. M. PITKIN.
COMBINED GRAVITY AND POWER TRANSPORTATION LINE.
APPLICATION FILED MAR. 12, 1914.
1,099,314.
Patented June 9, 1914.
6 SHEETS—SHEET 6.
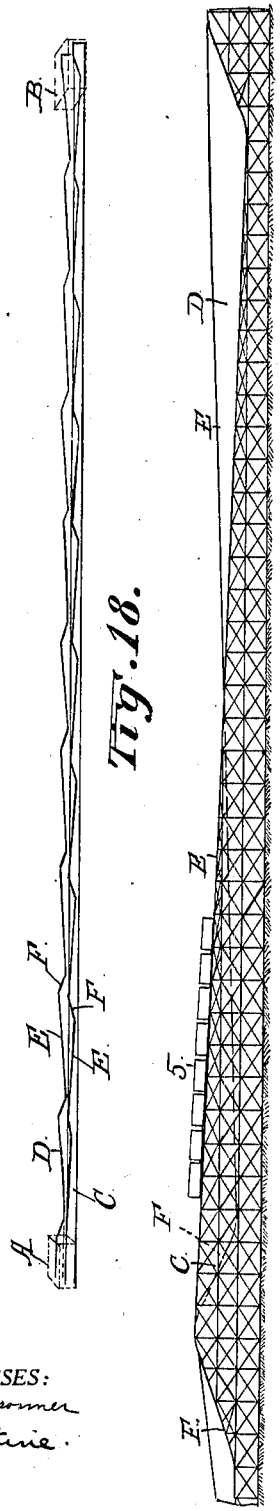
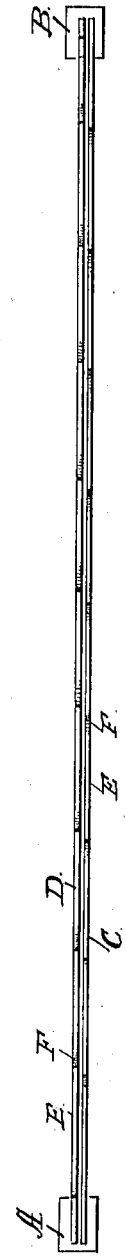
WITNESSES:
INVENTOR.
James M. Pitkin
BY
ATTORNEY.

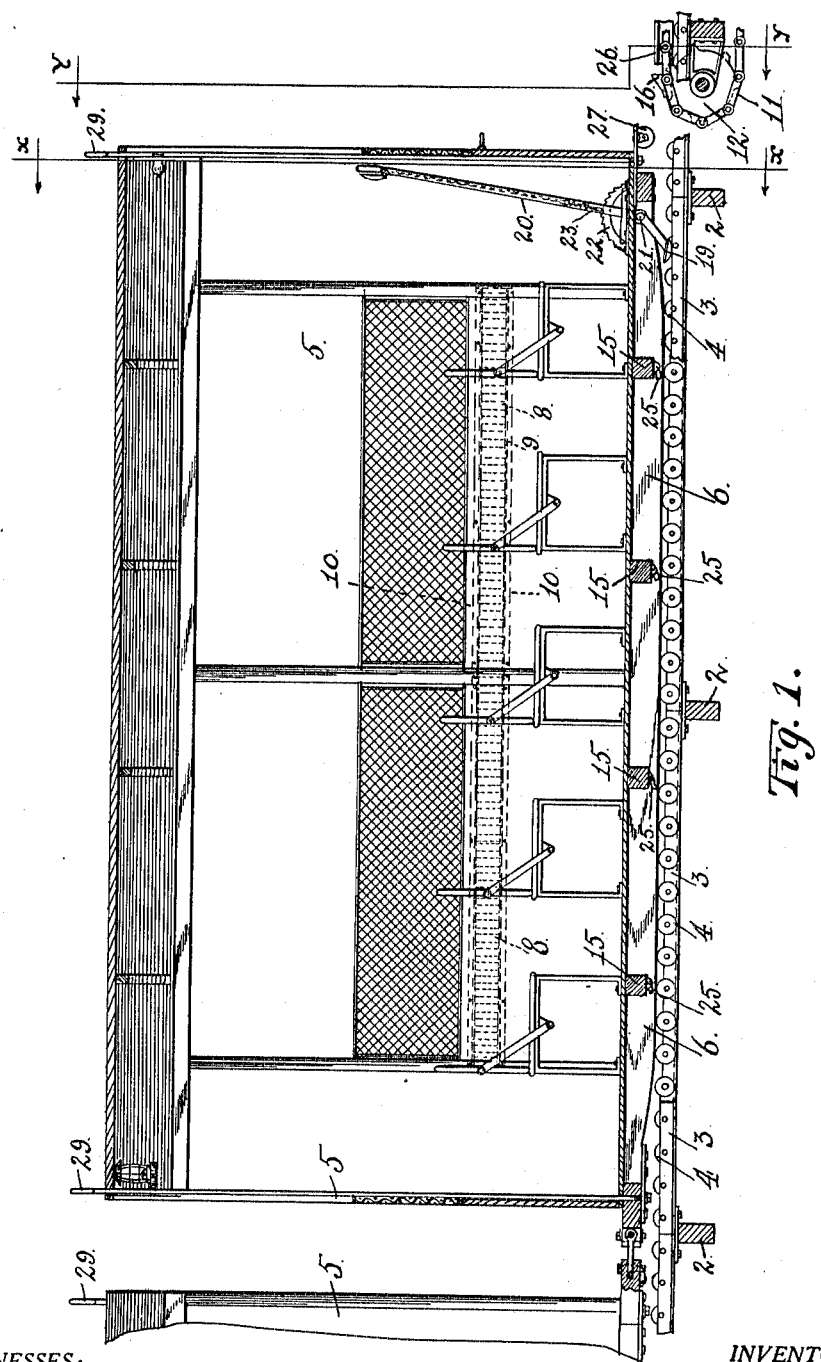

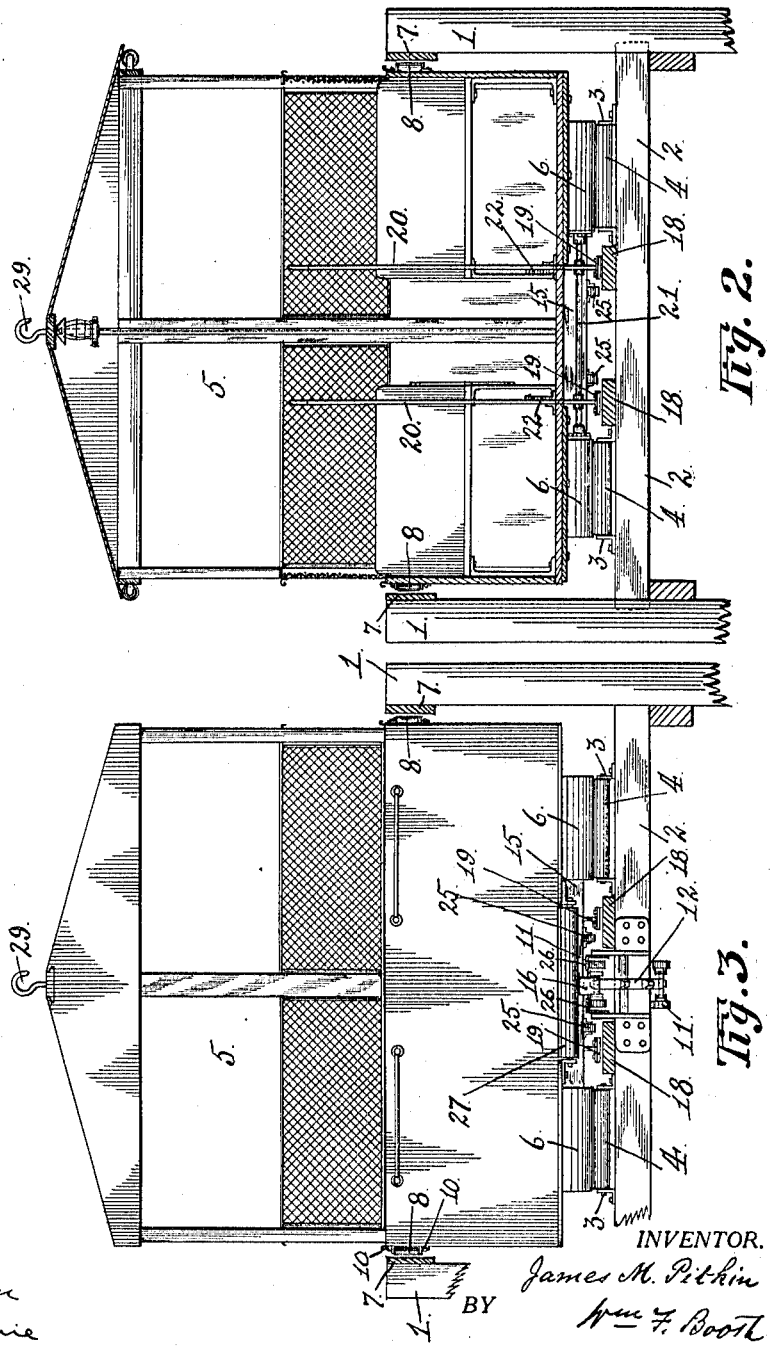

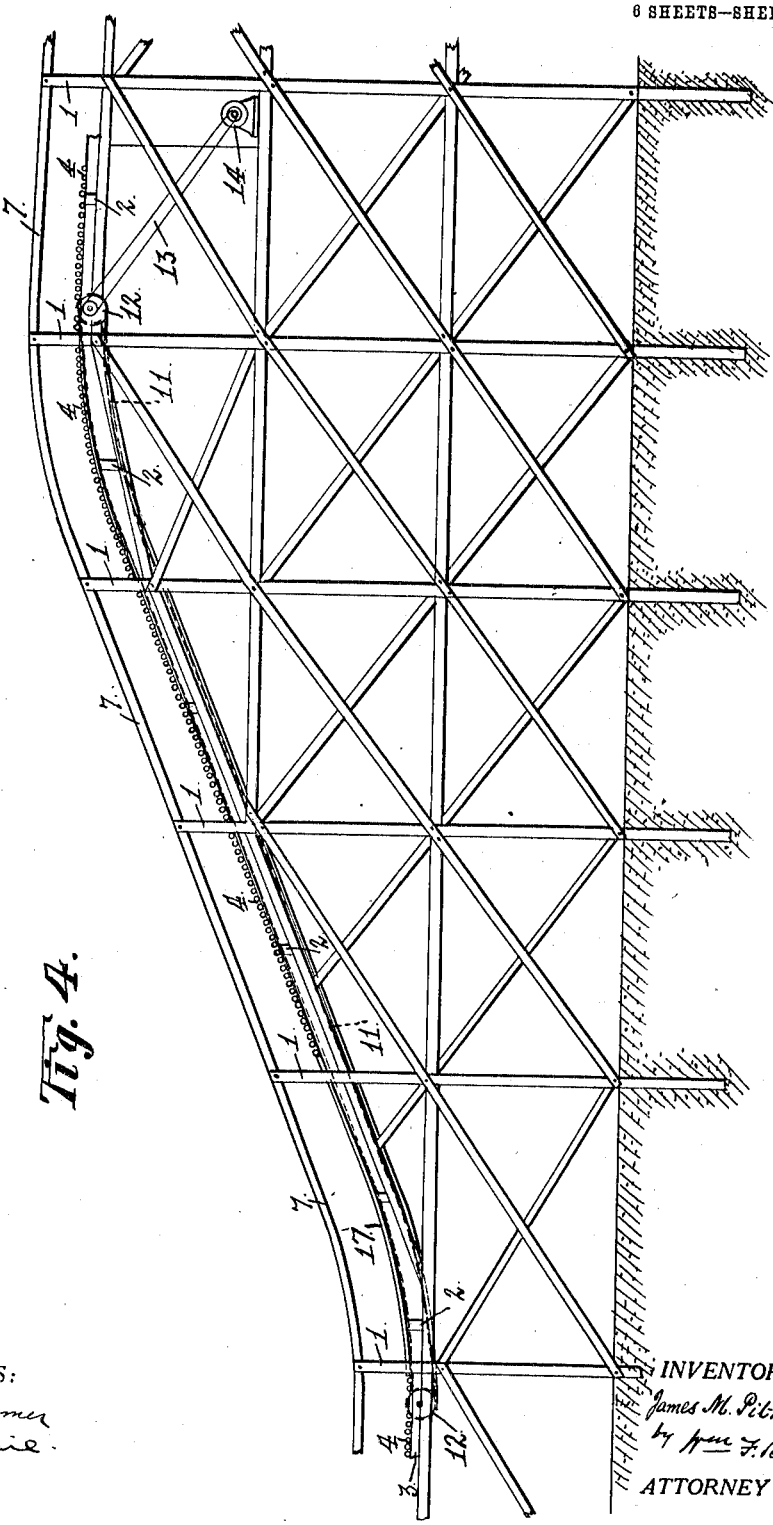

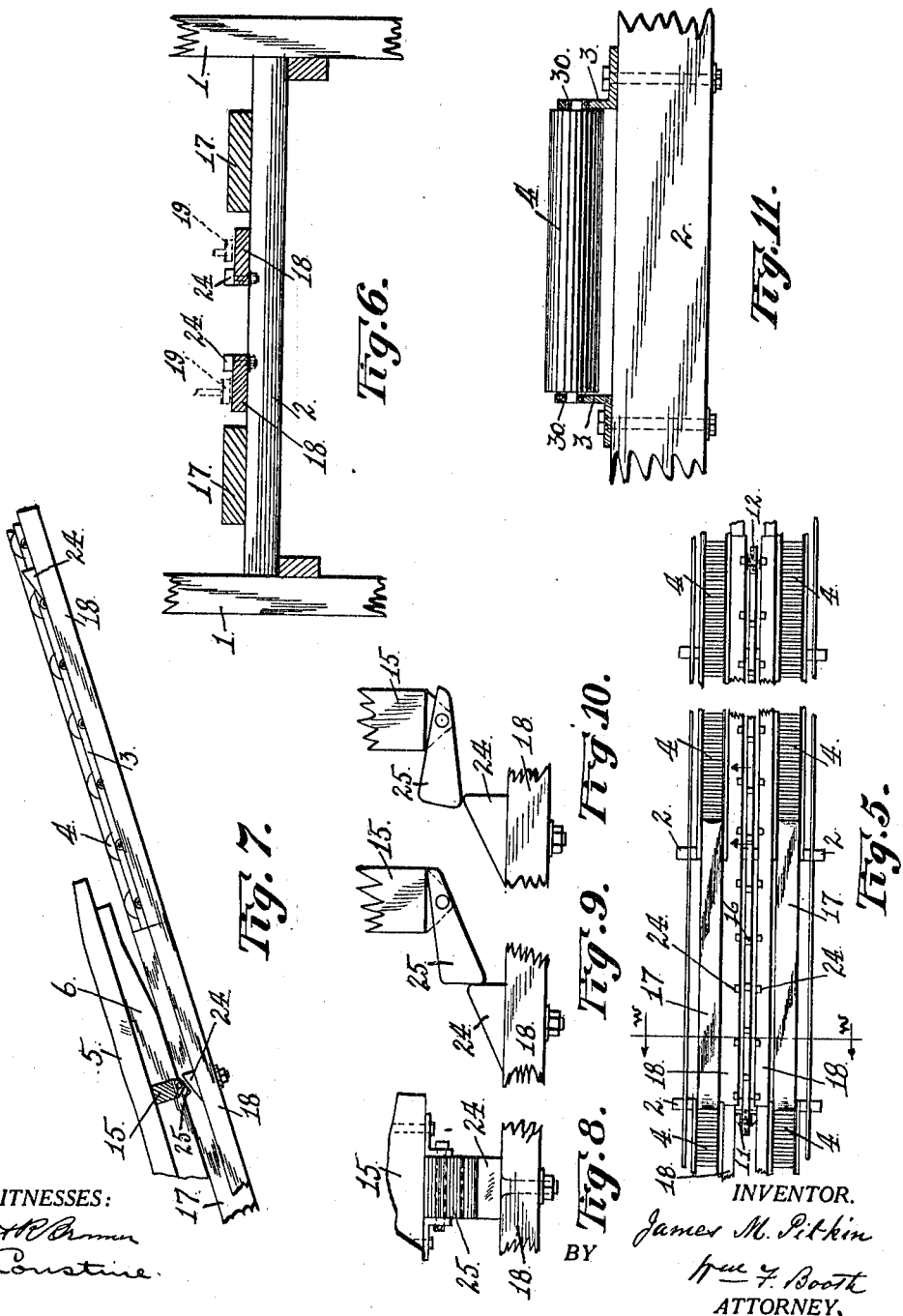

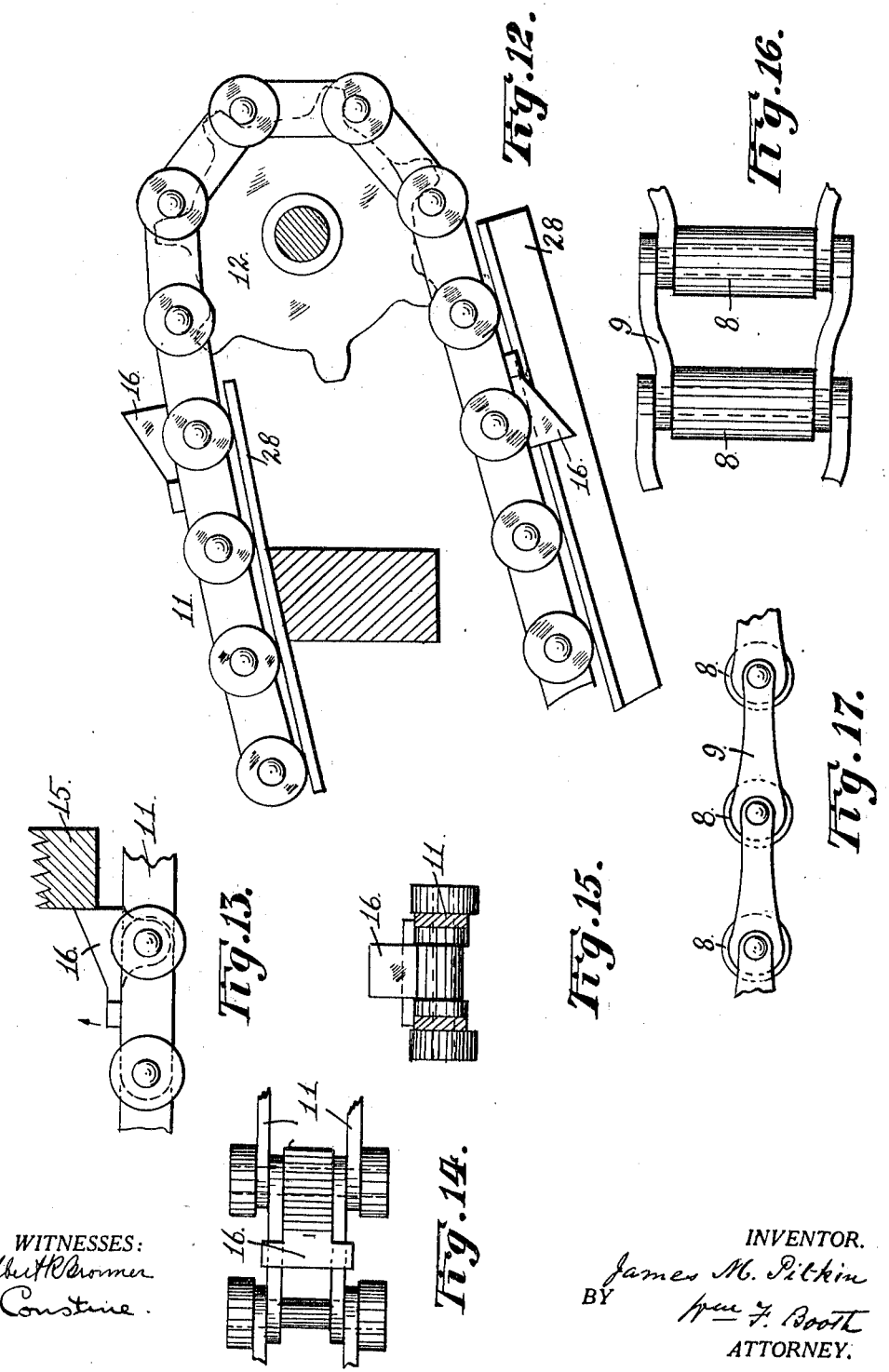

UNITED STATES PATENT OFFICE.

JAMES M. PITKIN, OF SAN FRANCISCO, CALIFORNIA.

COMBINED GRAVITY AND POWER TRANSPORTATION-LINE.

1,099,314.   Specification of Letters Patent.   Patented June 9, 1914.

Application filed March 12, 1914. Serial No. 824,297.

*To all whom it may concern:*

Be it known that I, JAMES M. PITKIN, a citizen of the United States, residing at the city and county of San Francisco, and State of California, have invented certain new and useful Improvements in Combined Gravity and Power Transportation-Lines, of which the following is a specification.

My invention relates to the class of transportation lines in which the force of gravity as a means for the progression of the cars is mainly relied upon, but to which is added a power propulsion to overcome the up-grades necessarily encountered on the line.

The object of my invention is to provide a transportation line of this type which is economical in construction and operation, and is provided with all necessary safeguards.

To this end my invention consists in the novel combined gravity and power transportation line which I shall now fully describe by reference to the accompanying drawings in which—

Figure 1 is a vertical sectional view showing a train of cars about to pass from a momentum terminal of a gravity section to a power section of the line. Fig. 2 is a section on the line $x$—$x$ of Fig. 1. Fig. 3 is a section on the line $y$—$y$ of Fig. 1. Fig. 4 is a side-elevation of the line at one of its up-grade or power sections. Fig. 5 is a broken plan view of an up-grade section. Fig. 6 is a section, enlarged, on the line $w$—$w$ of Fig. 5. Fig. 7 is a side view, enlarged, of a portion of the up-grade section. Fig. 8 is a front view of one of the safety-catches. Fig. 9 is a side view of the same, showing the catch in action. Fig. 10 is a similar view showing the catch normally riding over its stop. Fig. 11 is an enlarged detail of one of the car supporting rollers. Fig. 12 is a fragmentary side view, enlarged, of the power-chain. Fig. 13 is a fragmentary side view of one of the pick-up lugs of the power chain, showing it engaging one of the cross-bars of the car. Fig. 14 is a top-view of one of the pick-up lugs of the chain. Fig. 15 is a front view of the same. Fig. 16 is an elevation of a fragment of the roller-carrying chain which forms the side-steadying contact of the car. Fig. 17 is a side view of the same. Fig. 18 is a diagrammatic view, in perspective, showing a sample out and in-line to illustrate its possible gravity and power sections. Fig. 19 is a plan view of the same. Fig. 20 is a side view of one portion of the sample line showing one grade of each character.

For the sake of clearness, I will take up first, Figs. 18, 19 and 20, in order to show the general character of my contemplated line.

A is one terminal station and B is the other. C is the out-line and D is the in-line. It will be seen that each line is indicated as having a series or succession of alternating down and up grades, the former represented by E being longer than the latter, designated by F, so that gravity may be mainly relied upon. The down-grades I will call the gravity sections and the up-grades, the power sections.

Referring now to Figs. 1, 2 and 3, a suitable frame or structure is provided, composed essentially of uprights 1 and cross pieces 2. Upon the cross pieces 2 are secured longitudinal roller-bearers, best made in the form of angle irons 3, and in these are mounted the carrying rollers 4. These rollers are without end flanges or guards. There are two separated and parallel lines of these rollers in the same horizontal planes, one on each side, so that a space is left between them for other necessary parts.

5 is the car. Each car is provided with a longitudinal sill or runner 6, one on each side. These runners have no side flanges or guards and they rest and travel upon the flangeless, unguarded rollers 4, and support the car thereon without side friction. The ends of the runners are beveled or curved upwardly to enter upon and pass over the rollers with facility. The uprights 1, as seen in Figs. 2 and 3, have secured to their inner faces the longitudinal plates 7. These serve as steadying safety contacts for the car, and in order that this contact shall be with as little friction as possible, I provide the sides of the car with a horizontal line of vertically disposed freely rotatable rollers 8. These rollers may be secured to the car in any suitable manner. I prefer that they shall be carried as a series by a link-chain 9, as shown in Figs. 16 and 17, said chain being properly secured to the car, as, for example, between plates 10 indicated by the dotted lines in Fig. 1.

At an up-grade or power section of the line, there is an endless propelling chain 11, as seen in Fig. 4. This chain is mounted on terminal sprockets 12, one of which is here shown as being driven by a belt 13 from a motor 14, thus indicating any suitable means of applying power to the chain. This power chain operates in the middle of the space between the parallel lines of supporting rollers 4 and as shown in Figs. 1 and 4, it begins where the up-grade commences and is adapted to receive the car which advances within its sphere of action under its gravity momentum. At this point the car is automatically picked up by the power chain, by means as follows:—Under the car between the sills or runners 6 are the cross-bars 15, at suitable intervals. On the chain 11, at corresponding intervals, are the pick-up lugs 16. The general character of a chain suitable for the purpose is shown in Figs. 12 to 15, and in Fig. 13, one of the pick-up lugs 16 is shown as engaging behind one of the cross-bars 15 of the car. As the car enters upon an up-grade, one of these pick-up lugs rises to its contact with one of the cross-bars and then other lugs in succession engage following cross-bars and thus the car is carried up the grade to the crest where it automatically parts with the chain and proceeds by gravity on the next down-grade.

There is of course a power chain at each up-grade, or, at least, at each grade, which on account of length or pitch or its relation to the preceding gravity section is such that the momentum of the car acquired by gravity is not sufficient to carry it over. Now, in order to avoid any possible hindrance which the supporting rollers might offer at the inception of the up-grade, as, for example, the tendency of the car runners to bump the rollers at the more or less abrupt change of grade, I omit said rollers at such a point, and substitute for them the smooth plane-surfaced flat rails 17, which are shown clearly in Figs. 4 to 7. Upon these rails the car runners rest and slide from the point where the abrupt change of grade begins to any point on the grade where the inclination is again uniform and then the rollers 4 begin again.

Referring once more to Figs. 2 and 3, there are brake-plates 18 secured to the cross pieces 2 of the general frame structure. These extend longitudinally, one on each side, in the space between the dual lines of supporting rollers 4. Coacting with these brake-plates are the brakes 19, carried by the car. I prefer that these brakes be capable of separate operation, to indicate which I have shown each brake as carried by its own lever 20, each lever being separately pivoted on a cross shaft 21, as shown in Fig. 2. A suitable ratchet 22, shown in Fig. 1, will, in conjunction with the usual pawl 23, control the brake-lever. The advantage of having two separately operable brakes, in addition to the general greater safety of a double system, is that in case there should be, for any cause, a tendency of the car in traveling, to move more to one side than the other, such tendency may be corrected by the application of one of the brakes.

On the up-hill sections, which will necessarily be of relatively great pitch, there should be provided some means, in addition to the brakes, for insuring safety in case the power chain should break or, for any cause, the car should become disengaged from said chain. For this purpose, I have the following safety catch device. By reference to Fig. 5, it will be seen that the brake-plates 18, throughout the whole length of the up-hill section, are slightly widened toward each other, and they carry at close intervals the safety stops 24, which are beveled as shown in Figs. 7 to 10 in the up-grade direction and have abrupt faces as seen to lock against retrogression. Under each cross bar 15 of the car is pivotally mounted a safety catch 25, which normally rides up the beveled face of the stops 24, as seen in Fig. 10, and over said stops; but if the chain should break or for any other cause, the engagement of the car with the chain should be broken, then the catch 25 will contact with the abrupt face of the stop 24, as shown in Fig. 9, and the car will thereby be held. By properly relatively distancing these parts, several of the safety-catches may operate together and thus afford abundant security.

As seen in Figs. 1 and 3—the power chain 11 at its lower terminal has its links guided under fixed depression rails 26, one on each side, so that it is properly guided and held down at the change of grade, but to further insure its depression to the grade proper for its operation, I place on the front of the car, as seen in Fig. 1, a depression roller 27, which will force the chain down if it should be free of its guides 26. In Fig. 12, 28 are chain supporting rails at the upper terminal. In Figs. 1, 2 and 3, I show hooks 29 in the top of the cars. These are to enable the cars, by means of a suitable hoist to be lifted bodily from one line to the other at the stations. In Fig. 11, the supporting roller 4 is shown with ball bearings at 30.

I claim:—

1. In a transportation line of the described class, the combination of a supporting structure; flangeless, unguarded rollers carried by said structure; a car provided with flangeless runners to rest and travel upon the rollers; members carried by the supporting structure and disposed on each side of the body of the car; and steadying contacts between the car body and said members.

2. In a transportation line of the described class, the combination of a supporting structure; flangeless, unguarded rollers carried by said structure; a car provided with flangeless runners to rest and travel upon the rollers; members carried by the supporting structure and disposed on each side of the body of the car; and steadying rollers between the car body and said members.

3. In a transportation line of the described class, the combination of a supporting structure; flangeless, unguarded rollers carried by said structure; a car provided with flangeless runners to rest and travel upon the rollers; uprights of the supporting structure rising on each side of the car; longitudinal contact plates carried by said uprights opposite the sides of the car body; and rollers carried by the sides of the car body to contact with said plates.

4. In a transportation line of the described class, the combination of a supporting structure; rollers carried by said structure; a car provided with runners to rest and travel upon the rollers; uprights of the supporting structure rising on each side of the car; longitudinal contact plates carried by said uprights; and a chain secured longitudinally to each side of the car, said chain carrying freely rotatable rollers to steady the car by contact with said plates.

5. In a transportation line of the described class, the combination of a supporting structure having a succession of down and up grades; a line of rollers carried by said structure on all grades; a smooth rail carried by the structure, said rail being shorter than the up grade and interrupting the line of rollers only at the change to the up grade; and a car having runners to rest and travel upon said rollers and rail.

6. In a transportation line of the described class, the combination of a supporting structure having a succession of down and up grades; a line of rollers carried by said structure on all grades; a smooth rail carried by the structure, said rail being shorter than the up grade and interrupting the line of rollers only at the change to the up grade; a car having runners to rest and travel upon said rollers and rail; steadying members of the supporting structure on each side of the car; and steadying contacts between the car and said members.

7. In a transportation line of the described class, the combination of a supporting structure having a succession of down and up grades; a line of flangeless, unguarded rollers carried by said structure; a car having flangeless runners to rest and travel upon said rollers; a traveling power device located in the structure at the up grades; means for automatically connecting the car with said traveling power device; steadying members of the supporting structure on each side of the body of the car; and steadying contacts between the car body and said members.

8. In a transportation line of the described class, the combination of a supporting structure having a succession of down and up grades; a line of rollers carried by said structure on all grades; a smooth rail carried by the structure, said rail being shorter than the up grade and interrupting the line of rollers only at the change to the up grade; a car having runners to rest and travel upon said rollers and rail; a traveling power device located in the structure at the up grades; and means for automatically connecting the car with said traveling power device.

9. In a transportation line of the described class, the combination of a supporting structure having a succession of down and up grades; a line of rollers carried by said structure on all grades; a smooth rail carried by the structure, said rail being shorter than the up grade and interrupting the line of rollers only at the change to the up grade; a car having runners to rest and travel upon said rollers and rail; a traveling power device located in the structure at the up grades; means for automatically connecting the car with said traveling power device; steadying members of the supporting structure on each side of the car; and steadying contacts between the car and said members.

10. In a transportation line of the described class, the combination of a supporting structure having a succession of down and up grades; a line of rollers carried by said structure; a car having runners to rest and travel upon said rollers; a traveling power device located in the structure at the up grades; means for automatically connecting the car with said traveling power device; and coacting automatic safety-devices carried by the supporting structure at the up-grades and by the car, called into action by a retrogression of the car on said up grades.

11. In a transportation line of the described class, the combination of a supporting structure having a succession of down and up grades; a line of rollers carried by said structure; a car having runners to rest and travel upon said rollers; a traveling power device located in the structure at the up grades; means for automatically connecting the car with said traveling power device; coacting automatic safety-devices carried by the supporting structure at the up-grades and by the car, called into action by a retrogression of the car on said up grades; steadying members of the supporting structure on each side of the car; and steadying contacts between the car and said members.

12. In a transportation line of the described class, the combination of a supporting structure having a succession of down and up grades; a line of rollers carried by said structure; a car having runners to rest and travel upon said rollers; a traveling chain carried by the structure at the up grades; means for automatically connecting the car with the traveling chain; guides for said traveling chain; and a roller carried by the car adapted to insure the depression of said chain to its guides.

13. In a transportation line of the described class, the combinaton of a supporting structure; two parallel longitudinal lines of flangeless, unguarded rollers carried by the structure, said lines lying in the same horizontal planes and separated one from the other to leave a space between them; a car having flangeless runners to rest and travel upon said lines of rollers; uprights of the supporting structure rising on each side of the car; longitudinal contact plates carried by said uprights; and rollers carried by the sides of the car to contact with said plates.

14. In a transportation line of the described class, the combination of a supporting structure; two parallel longitudinal lines of rollers carried by the structure, said lines lying in the same horizontal planes and separated one from the other to leave a space between them; a pair of parallel longitudinal brake-plates carried by the structure in the space between the lines of rollers; a car having runners to rest and travel upon the rollers; and a braking device on the car to operate on the brake-plates.

15. In a transportation line of the described class, the combination of a supporting structure; two parallel longitudinal lines of flangeless, unguarded rollers carried by the structure, said lines lying in the same horizontal planes and separated one from the other to leave a space between them; a pair of parallel longitudinal brake-plates carried by the structure in the space between the lines of rollers; a car having flangeless runners to rest and travel upon the rollers; a braking device on the car to operate on the brake-plates; steadying members of the supporting structure on each side of the body of the car; and steadying contacts between the car body and said members.

16. In a transportation line of the described class, the combination of a supporting structure; two parallel longitudinal lines of rollers carried by the structure, said lines lying in the same horizontal planes and separated one from the other to leave a space between them; a pair of separated longitudinal parallel brake-plates carried by the structure in the space between the lines of rollers; a car having runners to rest and travel upon the rollers; and a pair of separately operatable braking devices on the car to operate on the pair of brake-plates.

17. In a transportation line of the described class, the combination of a supporting structure; two parallel longitudinal lines of rollers carried by the structure, said lines lying in the same horizontal planes and separated one from the other to leave a space between them; a pair of separated longitudinal parallel brake-plates carried by the structure in the space between the lines of rollers; a car having runners to rest and travel upon the rollers; a pair of separately operatable braking devices on the car to operate on the pair of brake-plates; steadying members of the supporting structure on each side of the car; and steadying contacts between the car and said members.

18. In a transportation line of the described class, the combination of a supporting structure having a succession of down and up-grades; two parallel longitudinal spaced lines of rollers carried by the structure, said lines lying in the same horizontal planes; longitudinal brake-plates carried by the structure in the space between the lines of rollers; a car having runners to rest and travel upon the lines of rollers; braking devices carried by the car coacting with the brake-plates; a traveling chain carried by the structure at the up grades and disposed in the space between the roller lines; automatic connections between the car and chain; safety stops carried by the brake-plates at the up grades; and automatic catches on the car to coact with said stops upon the retrogression of the car on the up-grades.

19. In a transportation line of the described class, the combination of a supporting structure having a succession of down and up-grades; two parallel longitudinal spaced lines of rollers carried by the structure, said lines lying in the same horizontal planes; longitudinal brake-plates carried by the structure in the space between the lines of rollers; a car having runners to rest and travel upon the lines of rollers; braking devices carried by the car coacting with the brake-plates; a traveling chain carried by the structure at the up grades and disposed in the space between the roller lines; automatic connections between the car and chain; safety stops carried by the brake-plates at the up grades; automatic catches on the car to coact with said stops upon the retrogression of the car on the up-grades; steadying members of the supporting structure on each side of the car; and steadying contacts between the car and said members.

20. In a transportation line of the described class, the combination of a supporting structure having a succession of down and up-grades; two parallel spaced lines of flangeless, unguarded rollers carried by the structure; a car having flangeless runners to rest and travel upon said rollers; a traveling chain carried by the structure at the up grades and disposed between the spaced lines of rollers; pick up lugs on the chain; cross bars on the car with which said lugs engage to carry the car up the grades; steadying members of the supporting structure on each side of the body of the car; and steadying contacts between the car body and said members.

21. In a transportation line of the described class, the combination of a supporting structure having a succession of down and up-grades; two parallel spaced lines of rollers carried by the structure; brake plates on the structure lying between the spaced rollers; a car having runners to rest and travel on the lines of rollers; braking devices on the car to coact with the brake-plates; a traveling chain carried by the structure at the up grades and disposed between the spaced lines of rollers; pick up lugs on the chain; cross pieces on the car with which said lugs engage to carry the car up the grades; safety-stops on the brake plates on the up grades; and catches on the cross bars of the car to coact with said stops.

22. In a transportation line of the described class, the combination of a supporting structure having a succession of down and up-grades; two parallel spaced lines of rollers carried by the structure; brake plates on the structure lying between the spaced rollers; a car having runners to rest and travel on the lines of rollers; braking devices on the car to coact with the brake-plates; a traveling chain carried by the structure at the up grades and disposed between the spaced lines of rollers; pick up lugs on the chain; cross pieces on the car with which said lugs engage to carry the car up the grades; safety-stops on the brake plates on the up grades; catches on the cross bars of the car to coact with said stops; steadying members of the supporting structure on each side of the car; and steadying contacts between the car and said member.

In testimony whereof I have signed my name to this specification in the presence of two subscribing witnesses.

JAMES M. PITKIN.

Witnesses:
  WM. F. BOOTH,
  D. B. RICHARDS.

---

Copies of this patent may be obtained for five cents each, by addressing the "Commissioner of Patents, Washington, D. C."